Jan. 16, 1968  G. W. MEEK  3,363,885
MODULAR COOLING TOWER
Filed Dec. 22, 1964  3 Sheets-Sheet 1

INVENTOR
GEORGE W. MEEK
BY
ATTORNEYS

Jan. 16, 1968    G. W. MEEK    3,363,885
MODULAR COOLING TOWER

Filed Dec. 22, 1964    3 Sheets-Sheet 2

INVENTOR
GEORGE W. MEEK
BY
ATTORNEYS

Jan. 16, 1968  G. W. MEEK  3,363,885
MODULAR COOLING TOWER
Filed Dec. 22, 1964  3 Sheets-Sheet 3
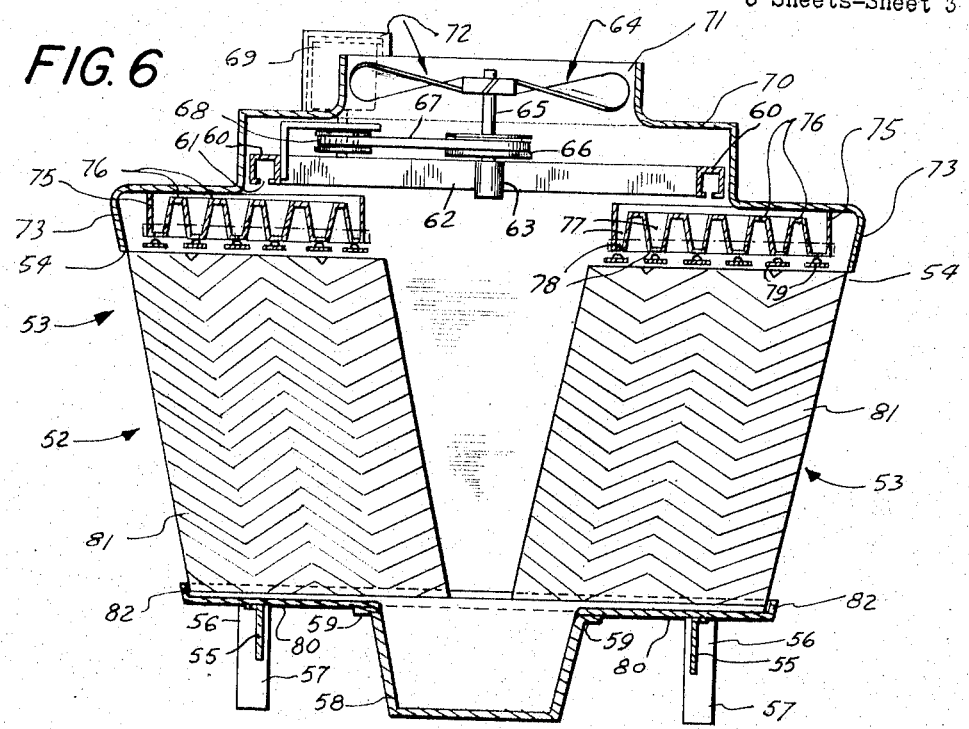
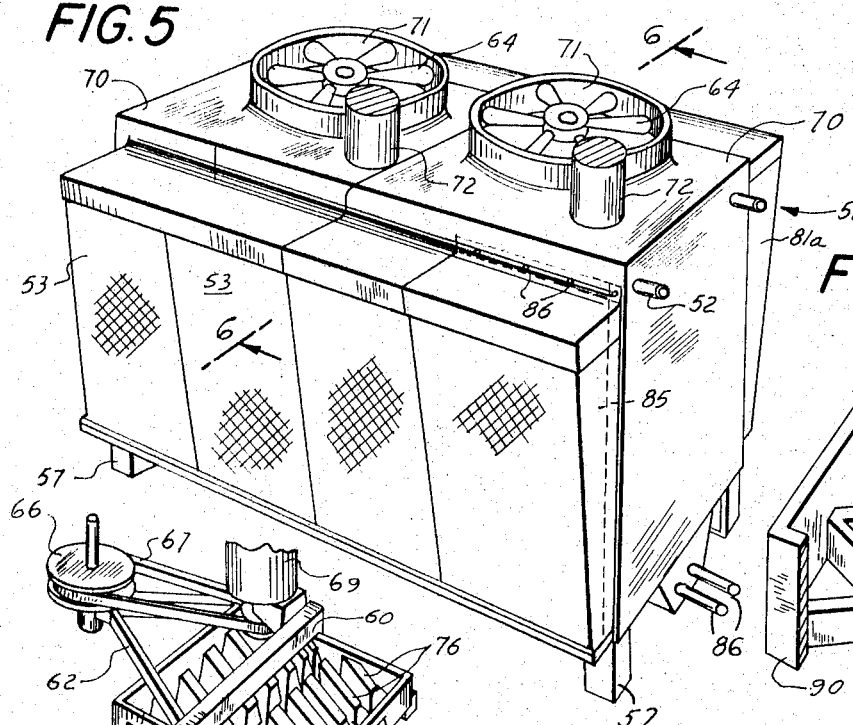
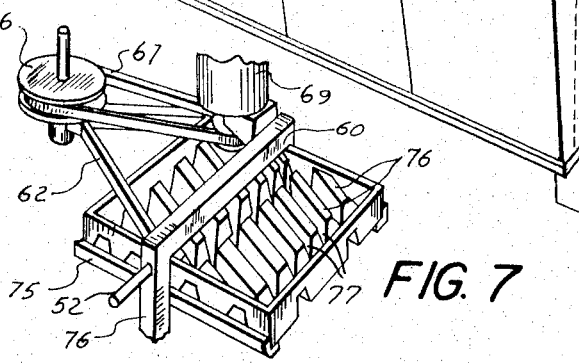
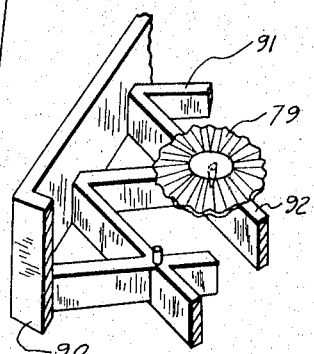
INVENTOR
GEORGE W. MEEK
BY
ATTORNEYS

United States Patent Office 3,363,885
Patented Jan. 16, 1968

3,363,885
MODULAR COOLING TOWER
George W. Meek, Fort Myers, Fla., assignor to Munters & Co., Stocksund, Sweden, a Swedish company
Filed Dec. 22, 1964, Ser. No. 420,350
13 Claims. (Cl. 261—30)

ABSTRACT OF THE DISCLOSURE

A cooling tower wherein gas and liquid are contacted and including a plurality of modular packing units mounted on hollow frame elements through which liquid is supplied to such units.

---

The present invention relates to gas and liquid contact apparatus and more particularly to cooling towers for cooling water by evaporating a part of the water flowing therethrough.

Conventional cooling towers comprise a casing enclosing a gas and liquid contact packing of spaced members over which water flows by gravity and between which air is directed to evaporate a portion of the water. Water is supplied to the top of the packing by a liquid distributing means and the cooled water is collected in a sump tank at the bottom of the tower. A fan is usually provided for producing a forced draft of air through the packing.

It has heretofore been the usual practice to fabricate large cooling towers at the place where they are to be used. This is necessitated by the size and structural strength required of the supporting members as well as by the arrangement of the packing or fill through which the water and air flow in contact with each other. In other words, it is first necessary to build a supporting structure, and because of the large size of the frame and problem of access, the packing or fill is built into the tower as it is being fabricated. As a result, each individual cooling tower is designed and built for the particular conditions, such as capacity, at the place where it is to be used.

One of the objects of the present invention is to provide an incremental cooling tower of prefabricated gas and liquid contact units which may be easily and quickly assembled into a single unit of any required size and capacity.

Another object is to provide a cooling tower of prefabricated modular packing units detachably mounted on a skeleton frame to which gas and liquid are supplied.

Another object is to fabricate a cooling tower of self-contained modular packing units of a size to adapt them to be easily handled for transportation and quick assembly at the site where the apparatus is to be used.

Still another object is to provide a cooling tower of the type indicated which is of simple and compact construction, economical to manufacture, and one which is efficient in performing its intended functions.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 5 is a perspective view of a cooling tower of modified construction showing a plurality of modular packing units mounted in openings in the side thereof with at least one opening closed by a cover panel;

FIGURE 6 is a sectional view taken on line 6—6 of FIGURE 5 and showing the manner of mounting the modular packing units in the open side of the frame and the novel arrangement of parts;

FIGURE 7 is a perspective view of one form of liquid distributor illustrated in FIGURE 6; and FIGURE 8 is a perspective view of a modified form of a liquid distributor.

Figure 1:
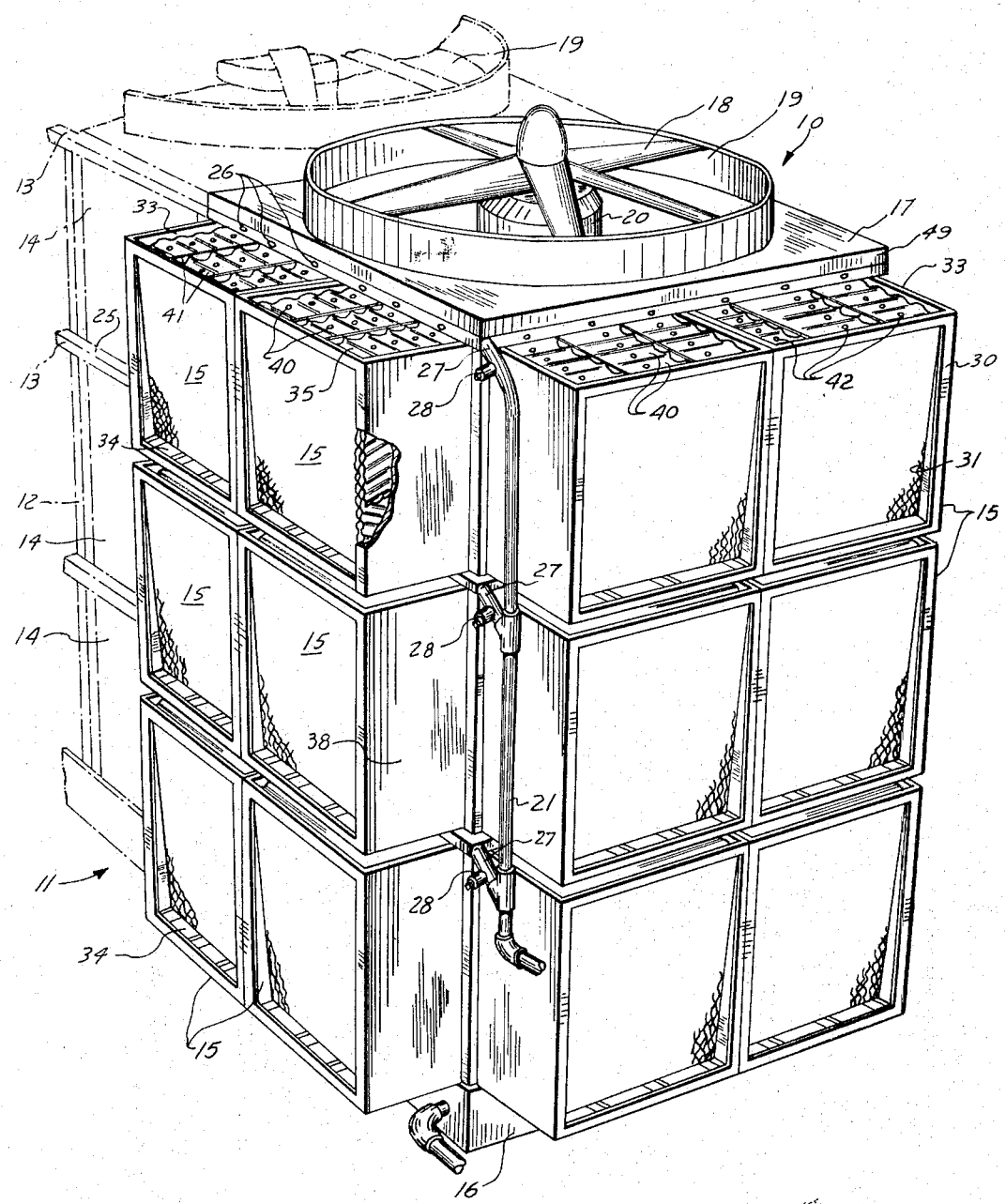
FIGURE 1 is a perspective view of a cooling tower incorporating the novel features of the present invention and showing the prefabricated modular packing units mounted on a skeleton frame around the periphery thereof.
Figure 2:
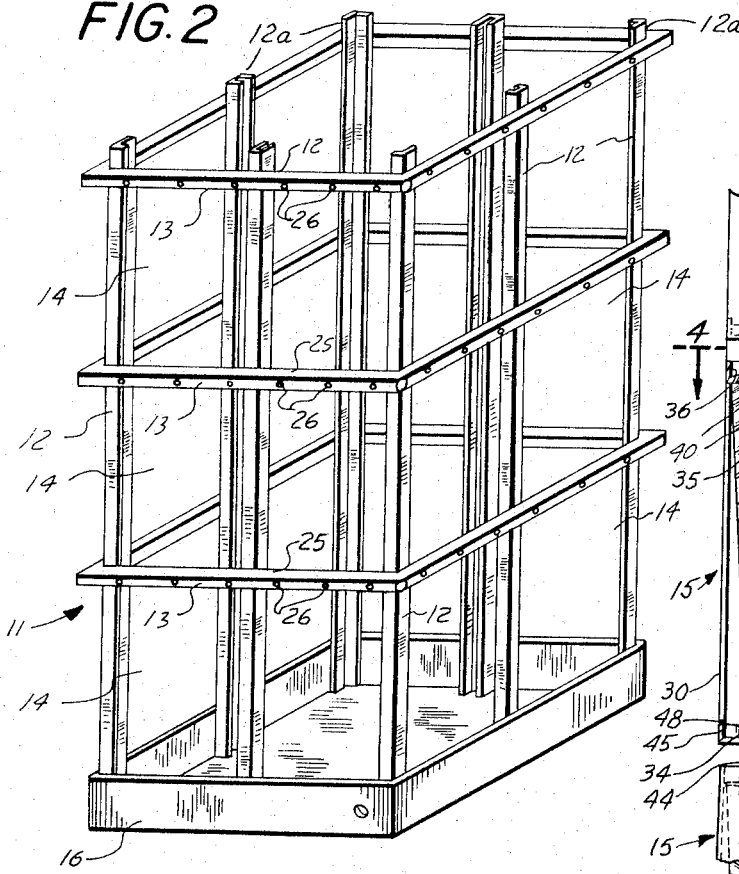
FIGURE 2 is a perspective view of the skeleton frame showing the horizontal stringers for connecting the upright stanchions and supporting the packing units in the form of hollow pipes for distributing water to the units.

FIGURES 1 to 5 of the drawings illustrate one form of incremental cooling tower incorporating the novel features of the present invention. As shown in FIGURES 1 and 2 the cooling tower 10 comprises an open rectangular frame 11 of upright columns 12 and transverse stringers 13 forming a plurality of openings 14 therebetween of the same size and shape around the entire periphery of the frame 10. Mounted over each opening 14 is a prefabricated air and liquid contact packing unit 15 which projects outwardly from the frame 11. Underlying the frame 11 is a sump tank 16 and overlying the top of the frame is a cover 17. A fan 18 rotates in a circular opening 19 in the cover 17 and the fan is driven by a motor 20. Each of the packing units 15 is a complete self-contained cooling tower entity having a frame supporting the gas and liquid contact elements in spaced relation, a liquid distributor and a sump, and the plurality of units are so mounted on the frame 11 as to operate in parallel as a single cooling tower.

The rectangular frame 11 also may be made of any number of incremental units and two square frame units are shown in FIGURE 1. It will be understood, however, that a greater number of the square frame units may be combined in adjacent side by side relation in a line or they may be arranged to form a larger square or rectangle. In the embodiment illustrated in FIGURE 1 with two of the square frame units arranged in line, separate covers 17 and fans 18 are provided for each incremental frame unit. In addition each incremental frame unit may be made to mount any number of prefabricated packing units to produce the required capacity. The maximum capacity for each square frame unit as illustrated in FIGURE 2 would comprise a packing unit 15 mounted over each opening 14 on all four sides or, in other words, twenty-four packing units on one frame 11. If only one-half of the maximum capacity is required the openings 14 on two of the sides could be closed by cover plates (not shown). Thus, the cooling tower capacity of each frame unit can be varied from a minimum to a maximum in increments of one twenty-fourth of the maximum capacity.

Referring now to FIGURE 2, the frame 11 is shown in detail with the columns 12 shown in the form of angle iron stanchions extending vertically from each inner corner of the sump tank 16 and vertically spaced channels spaced equally between the corner stanchions. The stringers 13 encircle the columns or stanchions 12 and are attached thereto as by welding to provide a unitary square frame 11. In the illustrated embodiment three vertically spaced encircled stringers 13 are shown for forming six openings 14 on each side of the square frame 11. The stringers 13 are in the form of hollow rectangular pipe sections extending entirely around the frame 11 at the outside of the flanges and webs of the angle irons and channels forming the corner and intermediate stanchions or columns of the frame. Each encircling stringer pipe 13 provides a horizontal seat 25 for supporting the packing units 15 and has perforations 26 for delivering water onto the top of each of the units around the entire periphery of the frame. Water is supplied to each of the encircling stringers 13 from a standpipe 21, see FIGURE 1, through couplings 27, and each coupling is provided with a valve 28 for controlling the supply of water to each stringer. It is within the scope of this invention, of course, to provide additional valve means, when required, to disconnect sections of the encircling stringer 13, corresponding to each side of the frame, from the standpipe 21.

Figure 3:
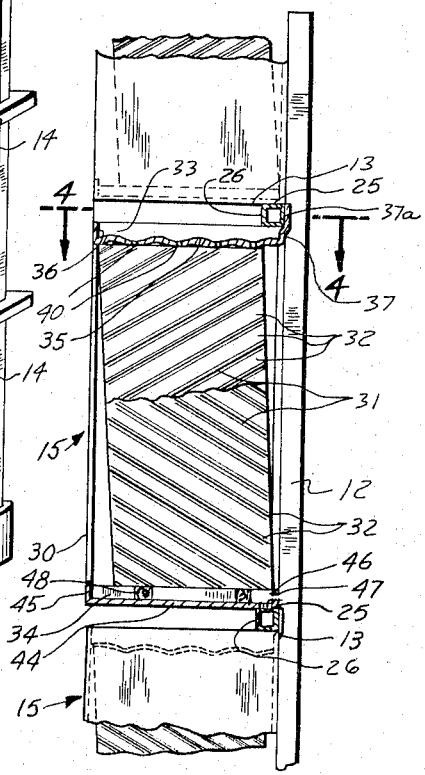
FIGURE 3 is a side elevational view partly in section to show the manner of mounting the modular gas and liquid contact units on the frame and the angular relation of the corrugations in adjacent sheets of the packing to hold them spaced from each other.
Figure 4:
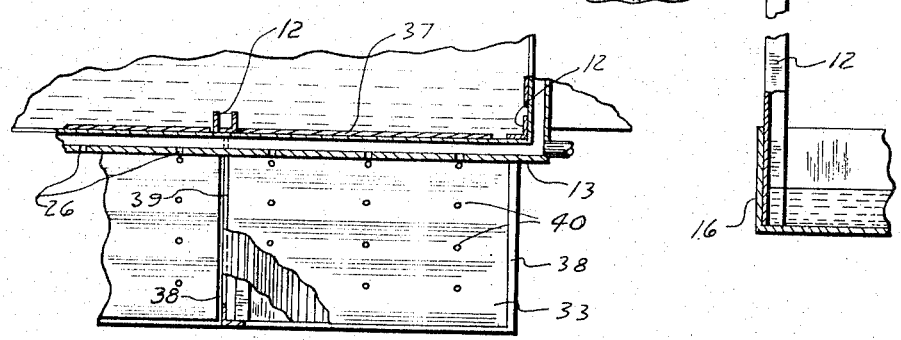
FIGURE 4 is a sectional view taken on line 4—4 of FIGURE 3 to show the relation of the hollow perforated pipes of the frame and top of the modular units for delivering liquid into the liquid distributing trays of the units.

Each of the modular packing units 15 is a self-contained cooling tower unit of a size to adapt it to be easily handled for shipping and assembly and comprises a marginal frame 30 for supporting corrugated sheets 31 arranged vertically in side by side relation, see FIGURE 3. The sheets 31 may be held in spaced relation by any suitable means but in the preferred construction as illustrated in FIGURES 1 and 3, sheets 31 have corrugations 32 extending at an angle of, for example, 30° to a horizontal plane with the adjacent sheets reversed so that the corrugations of adjacent sheets cross. Thus, the angular relationship of the corrugations in adjacent sheets 31 holds the sheets spaced from each other a distance equal to the depth of the corrugations. In addition, the crossing corrugations provide intersections in the passages through which water flows generally vertically and air flows generally horizontally to create a turbulence and produce a maximum gas and liquid contact. It will also be noted in FIGURE 3 that the sheets are of rhomboidal shape, as shown in FIGURE 3 so that the sheets have forward and rearward edges which incline rearward from the top toward the bottom at an angle corresponding to the trajectory of a drop of water flowing downwardly by gravity but subjected to the force of air flowing horizontally so that all surfaces of the sheet will be wetted by the water.

As stated above, each prefabricated packing unit 15 constitutes a self-contained cooling element having a liquid distributing tray 33 overlying the top of the packing sheets 31 and a sump tank 34 underlying the sheets of each unit. As shown most clearly in FIGURES 1 and 3 the liquid distributing tray 33 is formed by the top plate 35 of the marginal frame 30 which has its forward and rearward edges folded upwardly to provide flanges 36 and 37. The tray 33 is completed by the side panels 38 and 39 of the marginal frame 30 of each unit, see FIGURE 4, which overlie the ends of the top plate flanges 36 and 37 and are attached thereto. Preferably, the top plate 35 of the marginal frame 30 is corrugated to increase its strength and form horizontally extending troughs which are perforated at spaced points 40 to deliver liquid onto the top of the packing sheets 31. As shown in FIGURE 1 at least one transverse trough 41 is provided in the top plate 35 to insure equal distribution of liquid to all the horizontal troughs of a tray.

The bottom plate 44 of the marginal frame 30 has its front and rearward edges folded upwardly to provide flanges 45 and 46 which cooperate with the side panels 38 and 39 of the marginal frame 30 to provide the sump tank 34. As shown most clearly in FIGURE 3, the rearward flange 46 of the sump tank 34 has perforations 47 through which the cooling tower discharges into the lower or collective sump tank 16 of the cooling tower. The packing sheets 31 are supported between spaced bars 48 in the sump tank 34 and the bottom of the liquid distributing tray 33.

As stated above, each modular packing unit 15 is detachably mounted on the frame 11 to overlie an opening 14 therein. To this end, the modular unit 15 rests on the top of a section of the hollow stringer pipe 13 and constituting a seat 25 as shown most clearly in FIGURE 3. Each of the modular units 15 is of a width to overlie its opening 14, the flange of an upright angle iron stanchion 12 at one side and one-half the web of the channel iron stanchion between the corner stanchions. Thus, the weight of the unit is supported on a section of stringer 13 and is held from rearward movement through the frame 11 by the engagement of its marginal frame 30 with the stanchions 12. In addition, the rearward flange 37 of the marginal frame 30 forming the liquid distributing tray 33 has an extension 37a of a width corresponding to the spacing between adjacent stanchions and projecting upwardly at the rear of a stringer section 13 overlying the unit to hold it against movement forwardly. Each packing unit 15 is mounted on the frame by tilting it at an angle to first hook the flange extension 37a of the unit with the rear of the stringer section 13 and then rocking the bottom of the unit rearwardly until its side edges engage the stanchoins. The bottom rearward corner will then rest on the top of the stringer secion 13 constituting the seat 25. Thus, the packing units 15 are mounted one over the other in position on the open frame 11 and are supported on an underlying stringer section 13 to underlie the perforations 26 of an overlying stringer section through which water is supplied onto the liquid distributing tray 33. The water then flows through the perforations in the liquid distributing tray 33 onto the top of the packing sheets 31 and then flows by gravity along the sides of the sheets into the underlying sump 34.

The cover 17 overlies the top of the open square frame 11 and has a depending peripheral flange 49 which rests on the top of top encircling stringer 13. In addition, the flange 49 of cover 17 engages extensions 12a of the stanchions above the stringer 13 for holding the cover in position on the frame.

Concurrently with the flow of water through the packing units 15, air is caused to flow horizontally between the packing sheets 31 by the fan 19 in the cover 17 to produce an intimate gas and liquid contact and evaporation of a portion of the water. For each pound of water evaporated 1000 B.t.u. are required which flow from the remaining water and reduce its temperature. Cooled water from the sump tank 34 of each of the modular packing units 15 then flows through the perforations 47 into the underlying sump tank 16 for the entire cooling tower unit.

FIGURES 5 to 8 illustrate a cooling tower 52 of modified construction in which the modular packing units 53 extend through openings 54 in the sides of the frame and are supported on stringers 55. As shown most clearly in FIGURES 5 and 6, the frame comprises corner stanchions 56 between which the angle-iron stringers 55 extend at a location above the supporting floor to provide feet 57 depending below the units 53. Positioned centrally between the stanchions 56 and extending lengthwise of the cooling tower 52 is a longitudinally extending sump tank 58 having a horizontal peripheral flange 59 at its upper edge in alignment with the top flange of the stringer 55. Extending between the corner stanchions 56 and overlying the packing units 53 is a pipe 60 having perforations 61. The corner stanchions 56 can be used for the supply of water to the pipe sections 60, or the water for these pipe sections can be delivered into them from the pipes shown projecting from the right end of the housing near the upper end thereof in FIG. 5. Extending inwardly from the frame formed by the corner stanchions 56 and pipe sections 60 is a bracket 62 having a bearing 63 for mounting a fan 64 for rotation at the center of the tower above the units. Fan 64 is mounted on a shaft 65 having a pulley 66 thereon and is driven by a belt 67 from the pulley 68 of a motor 69. The open top of the cooling tower is closed by a cover 70 having a circular opening 71 therein surrounded by a flange projecting upwardly from the cover to provide a shroud ring for the fan 64. The motor 69 is mounted on the bracket 62 and projects upwardly into a cylindrical chamber 72 in the cover 70.

In the form of the invention illustrated in FIGURES 5 to 8, the liquid distributing tray 75 is preferably made of a plastic and has re-entrant ribs 76 projecting upwardly from the bottom wall to reduce the volume of liquid carried by the tray and provide a series of troughs 77 overlying the top of the packing. The mounting of the trays is not shown in detail since it can be done in a number of different ways. The troughs 77 have spaced perforations 78 therein and in the form of the invention illustrated in FIGURES 6 and 7 splash discs 79 are suspended from the troughs by wire clips under each perforation 78 to distribute the water in the form of droplets to simulate rain. Each splash disc 79 is of generally conical shape with radial grooves over which the water flows and drips from the edges thereof.

In the modified construction the sump tank underlying the packing sheets 81 is in the form of a tray 80 with a marginal flange 82 on three sides and the edge of the tray on the fourth side overlying the edge of the sump tank 58. Side plates of a suitable light weight material, such as plastic, may extend between the sump tray 80 and the liquid distributing tray 75. However, in the form of construction illustrated in FIGURES 5 and 6, the liquid distributing tray 75 is supported by the frame independently of the sump tray 80 and the side sheets 81a of the packing provide closures for the sides of the unit as illustrated in FIGURE 5. It will be observed by reference to FIGURE 6 that the sheets 81 of the packing units 53 have zig-zag corrugations with sections of different lengths so that when reversed the corrugated sections on adjacent sheets cross each other to hold the sheets spaced from each other.

With the construction illustrated in FIGURES 5 to 8, the packing units 53 are merely slid into place through the continuous openings in the side of the cooling tower and are entirely supported by the stringer sections 55 and marginal flanges 59 of the sump tank 58. In addition the engagement of the bottom wall of the sump tray 80 of each packing unit with the flange 59 of the sump tank 58 seals the joint therebetween. The forward edge of the top of the packing unit sheets 81 are closed and sealed by the depending flange 73 of the cover 71. Thus, when all of the openings on each side of the frame are closed by modular units the cooling tower operates at maximum capacity. If less capacity is required the opening corresponding to any one of the units can be closed by a cover panel 85, as shown in FIGURE 5, by means of suitable fasteners 87. Thus, the capacity of a cooling tower 52 may be varied from one modular gas and liquid contact unit on one frame to as many as four on one frame. As shown in FIGURE 5, two frames are illustrated with four packing units 53 on one side and three on the other.

The form of construction illustrated in FIGURES 5 to 8 operates in substantially the same way as the form of the invention illustrated in FIGURES 1 to 3. Liquid delivered through the perforations 61 in the hollow pipe sections 60 falls into the liquid distributing tray 75 of each packing unit 53 and flows by gravity along the sides of the sheets 81. Air is caused to flow horizontally between the packing sheets 81 by the fan 64 to evaporate a portion of the water and thereby cool the remaining water to a temperature approaching the wet bulb temperature of the atmosphere. Water flows from the bottom of each gas and liquid contact unit into the sump tank 58 where it is discharged through the conduits 86.

FIGURE 7 illustrates how the liquid distributing tray 75 may be supported on the frame between stanchions 56 with a perforated liquid distributing pipe 60 overlying the tray. The frame illustrated in FIGURE 7 is adapted for a cooling tower having a single packing unit 53, or may be integrated with another similar frame and connected by cross struts or pipes to form the frame shown in FIGURE 6.

In place of the splash discs 79 detachably mounted on the liquid distributing tray 75, an open frame 90, as shown in FIGURE 8, may be provided which slides into position under the liquid distributing tray 75. The open frame 90 has cross members 91 and 92 with a splash disc 79 mounted at each intersection of the cross members to underlie a perforation 78 in the liquid distributing tray 75.

It will now be observed that the present invention provides an incremental cooling tower of prefabricated modular units which may be built up to any required size and capacity. It will further be observed that the present invention provides a cooling tower having a skeleton frame on which modular gas and liquid contact units are detachably mounted and to which air and water is supplied from said frame. It will still further be observed that the present invention provides a cooling tower having prefabricated modular cooling tower units of a size to adapt them to be easily handled for transportation and quick assembly into a larger single unit at the site where the apparatus is to be used. It will still further be observed that the present invention provides a cooling tower which is of simple and compact construction, economical to manufacture and one which is efficient in performing its intended function.

While two embodiments of the invention are herein illustrated and described, it will be understood that further modifications may be made in the construction and arrangement of elements without departing from the spirit or scope of the invention. Therefore, without limitation in this respect, the invention is defined by the following claims:

What is claimed is:

1. An incremental cooling tower of modular cooling units comprising a rectangular frame composed of vertical stanchions connected by hollow horizontal stringers to provide openings on all four sides and top of the frame, means to deliver cooling water to the horizontal hollow stringers, a prefabricated cooling unit in at least one of the openings in the four sides and supported on one of the stringers and engaging stringers above it, all of the openings in the sides of the frame without a cooling unit therein being closed by a removable panel, each of said cooling units having a packing of corrugated sheets, a liquid distributing means comprising a central water-supply pipe emptying into trays overlying the corrugated packing sheets and a tray underlying the plurality of sheets of packing in a self-contained unit, a sump tank underlying the trays of the plurality of units, a fan mounted centrally in the top of the open rectangular frame for producing a flow of air through the packing sheets of each unit mounted on the sides of the frame, and a cover overlying the top of the open frame for closing the top of the frame and providing a shroud for the fan.

2. A cooling tower comprising an open frame of equally spaced columns, vertically spaced transverse stringers lying adjacent to one side of the columns and attached thereto to connect the columns in a unitary structure, modular cooling tower units mounted on said frame, each modular unit having a marginal frame with air and liquid contact packing therein, each unit being supported on a horizontal stringer with the opposite sides of its marginal frame lying adjacent to at least a portion of adjacent columns, a retaining means projecting upwardly from the marginal frame of each unit to engage the stringer above the one on which it is supported to hold it in place thereon, means for delivering liquid through the transverse stringers and onto the top of each unit for flow through the packing therein, and means for producing flow of air through the packing.

3. A cooling tower comprising a sump tank, stanchions projecting upwardly from the corners of the sump tank and between the corners in equally spaced relation, vertically spaced horizontal hollow stringers extending around the stanchions at the outside thereof and attached thereto to provide an open rectangular frame, said stanchions and hollow stringers being so arranged as to provide openings therebetween of uniform shape and size around its entire outer periphery, prefabricated modular cooling tower units removably mounted on said frame and supported on the hollow stringers with their opposite sides lying adjacent to at least a portion of adjacent columns, each modular unit having a marginal frame with gas and liquid contact packing therein and at least one projection extending upwardly therefrom at the rear of the overlying stringer to hold it in place on the frame, means for delivering liquid through the horizontal stringers and onto the top of the packing of each unit for flow therethrough, means for delivering liquid from the packing of each unit into the sump tank, and a fan in the open top of the rectangular frame for producing a flow of gas from the exterior to the interior of the frame through the packing of the gas and liquid contact units.

4. A cooling tower comprising an open frame of spaced upright columns, hollow transverse pipes lying adjacent to one side of the columns and attached thereto to connect the columns in a unitary frame structure, modular cooling tower units interchangeably mounted on said frame and supported on a hollow transverse pipe with their opposite sides lying adjacent to at least a portion of adjacent columns, each unit having a marginal frame with air and liquid contact packing therein, a flange projecting upwardly from the marginal frame of each cooling tower unit and lying adjacent to the rear of the hollow transverse pipe above the one on which it is supported to hold it in place on the frame, means for delivering liquid to the transverse pipes, said transverse pipes being perforated to deliver liquid onto the top of the packing, and a fan for producing a flow of air through the unit.

5. A cooling tower in accordance with claim 4 in which the air and liquid contact packing is in the form of vertically arranged corrugated sheets mounted in the marginal frame, and the corrugations of adjacent sheets extending in angular relation to each other to hold them spaced from each other, and said packing being inclined inwardly from the top toward the bottom to compensate for the force produced by the flow of air therethrough and thereby insure complete wetting of each packing sheet.

6. A cooling tower in accordance with claim 4 in which the holding flange projecting upwardly from the marginal frame of each unit is of a width slightly less than the spacing between adjacent columns to center the unit between the columns.

7. A cooling tower in accordance with claim 4 in which a riser pipe is connected to the horizontal pipes, and a valve is provided between the riser and each horizontal pipe to control the working area and capacity of the cooling tower.

8. A cooling tower in accordance with claim 4 in which the marginal frame of each modular cooling tower unit is formed to provide a perforated liquid distributing tray overlying the top of the packing and a sump underlying the packing, and means for delivering liquid from the sump.

9. A cooling tower in accordance with claim 8 in which a sump tank underlies the frame, and conduit means for delivering cooled liquid from the sump tank of each cooling tower unit into the sump tank underlying the frame.

10. A cooling tower comprising an open rectangular frame of spaced columns and hollow horizontal stringers extending between the columns and attached thereto to connect the columns in a unitary structure, a sump tank positioned centrally in the rectangular frame, a perforated pipe at the top of the frame and at the center thereof, a bracket for mounting a fan at the center of the frame above the perforated pipe, a cover for closing the top of the frame and having a central opening providing a shroud for the fan, a plurality of banks of prefabricated modular cooling tower units mounted in the open sides of the frame, the perforated pipe being mounted to overlie the tops of the units in the several banks, each of said units comprising vertically arranged spaced sheets for air and liquid contact, a tray underlying the sheets and resting on the side of the sump tank in sealing engagement therewith, the sump tank being located between the banks of cooling tower units and a liquid distributor mounted above and overlying the top of the sheets, said liquid distributor underlying the perforated pipe, and means for supplying water to the perforated pipe for flow into the liquid distributing means.

11. A cooling tower in accordance with claim 10 in which the liquid distributing means comprises a tray having a series of troughs overlying the top of the packing, perforations at the bottom of the troughs, and splash discs underlying the perforations in the troughs for breaking up the streams of water into a plurality of fine streams of droplets spread uniformly over the area underlying each perforation.

12. A cooling tower in accordance with claim 11 in which the splash discs are supported from the liquid distributing tray.

13. A cooling tower in accordance with claim 11 in which the splash discs are mounted on an open frame slidably mounted between the liquid distributing tray and top of the packing sheets.

References Cited

UNITED STATES PATENTS

| | | |
|---|---|---|
| 1,520,125 | 12/1924 | Haas. |
| 1,531,112 | 3/1925 | Lichtenthaeler _____ 261—103 |
| 2,776,121 | 1/1957 | Fordyce. |
| 2,863,652 | 12/1958 | Mart _____ 261—11 X |
| 2,898,097 | 8/1959 | Goldsmith et al. |
| 3,115,534 | 12/1963 | Bottner. |
| 3,195,870 | 7/1965 | Gruber et al. _____ 261—109 X |
| 3,220,711 | 11/1965 | Leppard et al. ____ 261—115 X |
| 3,262,682 | 7/1966 | Bredberg _____ 261—112 X |

FOREIGN PATENTS

| | | |
|---|---|---|
| 571,510 | 8/1945 | Great Britain. |
| 927,032 | 5/1963 | Great Britain. |

HARRY B. THORNTON, *Primary Examiner.*

TIM R. MILES, *Assistant Examiner.*